(12) United States Patent
Wu

(10) Patent No.: US 10,839,450 B2
(45) Date of Patent: Nov. 17, 2020

(54) COMMUNICATION SYSTEM AND METHOD THEREOF

(71) Applicant: Taiwan Mobile Communication, Taipei (TW)

(72) Inventor: Jason Wu, Taipei (TW)

(73) Assignee: TAIWAN MOBILE COMMUNICATION, Taipei (TW)

( * ) Notice: Subject to any disclaimer, the term of this patent is extended or adjusted under 35 U.S.C. 154(b) by 186 days.

(21) Appl. No.: 16/155,319

(22) Filed: Oct. 9, 2018

(65) Prior Publication Data
US 2019/0355048 A1 Nov. 21, 2019

(30) Foreign Application Priority Data
May 15, 2018 (TW) .............................. 107116488 A

(51) Int. Cl.
*G06Q 30/06* (2012.01)
*H04W 48/02* (2009.01)
(Continued)

(52) U.S. Cl.
CPC ..... *G06Q 30/0635* (2013.01); *H04L 63/0407* (2013.01); *H04W 12/02* (2013.01); *H04W 48/02* (2013.01)

(58) Field of Classification Search
CPC .. G06Q 30/0635; H04W 48/02; H04W 12/02; H04W 12/38; H04W 12/00502;
(Continued)

(56) References Cited

U.S. PATENT DOCUMENTS

| | | | | |
|---|---|---|---|---|
| 6,954,791 | B2 * | 10/2005 | Darby | H04L 63/10 709/227 |
| 7,346,557 | B2 * | 3/2008 | Matsuura | G06Q 30/06 705/26.81 |

(Continued)

FOREIGN PATENT DOCUMENTS

| | | |
|---|---|---|
| CN | 101123548 A | 2/2008 |
| CN | 103001853 B | 10/2015 |

OTHER PUBLICATIONS

Article, "Patents; Researchers Submit Patent Application," "Establishing a Connection for a Video Call", for Approval (USPTO 20170064253); Mar. 23, 2017; Politics & Government Week [Atlanta]; : 9170, extracted from Google on Jun. 6, 2020.*

*Primary Examiner* — Yogesh C Garg
(74) *Attorney, Agent, or Firm* — Birch, Stewart, Kolasch & Birch, LLP

(57) ABSTRACT

A communication system to establish communication connections includes at least one first communication device configured for generating a service request; at least one second communication device; and a backend service device coupled to the first communication device and the second communication device, in which the backend service device is configured for generating a work order including information of the first communication device and the second communication device; in which during an effective period of the work order, a communication connection between the first communication device and the second communication device is allowed; and when beyond the effective period of the work order, the communication connection between the first communication device and the second communication device is not allowed.

17 Claims, 4 Drawing Sheets

(51) Int. Cl.
*H04L 29/06* (2006.01)
*H04W 12/02* (2009.01)
(58) Field of Classification Search
CPC .. H04W 76/14; H04L 63/0407; H04L 63/108; H04L 63/141; H04L 63/14; H04L 69/28
USPC .............. 705/26.1, 26.8, 26.41, 26.44, 26.81
See application file for complete search history.

(56) References Cited

U.S. PATENT DOCUMENTS

| | | | | |
|---|---|---|---|---|
| 2014/0358700 | A1* | 12/2014 | Setton | H05K 999/00 705/14.73 |
| 2015/0304237 | A1* | 10/2015 | Yip | H04L 47/781 709/225 |
| 2015/0381830 | A1* | 12/2015 | Wu | H04N 21/44227 348/207.1 |

* cited by examiner

COMMUNICATION SYSTEM AND METHOD THEREOF

RELATED APPLICATIONS

This application claims priority to Taiwan Application Serial Number 107116488, filed May 15, 2018, which is herein incorporated by reference.

BACKGROUND

Technical Field

The present disclosure relates to a communication system and a method thereof; more particularly, the present disclosure relates to a communication system and a method thereof for communication management.

Description of Related Art

With advances in technology, the tendency of people in purchasing service has gradually shifted towards online trading. However, it is difficult to find secure and appropriate services or items, and to communicate with suppliers with privacy being protected. Therefore, there is a need for a communication system and a method thereof that can provide a variety of secure services and allow customers to contact service suppliers with privacy being protected.

SUMMARY

An object of one embodiment in the present disclosure is to provide a communication system and a method thereof that can establish a communication connection service between communication devices at two ends.

Another object of the present disclosure is to provide a communication system and a method thereof that can monitor communication information transmitted between communication devices at two ends.

A communication system of the present disclosure includes a first communication device, a second communication device and a backend service device. The first communication device is configured to generate a service request. The backend service is coupled to the first communication device and the second communication device, and is configured for generating a work order including information of the first communication device and the second communication device according to a service request. During an effective period of the work order, a communication connection between the first communication device and the second communication is allowed. When beyond the effective period of the work order, the communication connection between the first communication device and the second communication device is not allowed.

A method for communication management in a communication system includes: receiving, by means of a backend service device, a service request from a first communication device; generating a work order including information of the first communication device and a second communication device according to the service request; during an effective period of the work order, establishing a communication connection between the first communication device and the second communication device; when beyond the effective period of the work order, the communication connection between the first communication device and the second communication device is not allowed.

DETAILED DESCRIPTION

Please refer the drawings and descriptions below related to a communication system and a method thereof of one embodiment of the present disclosure. The following descriptions will describe various different embodiments of the communication system and the method thereof in the present disclosure. However, the scope of the present disclosure is not limited to the drawings provided herein or the embodiments described below.

Figure 1:
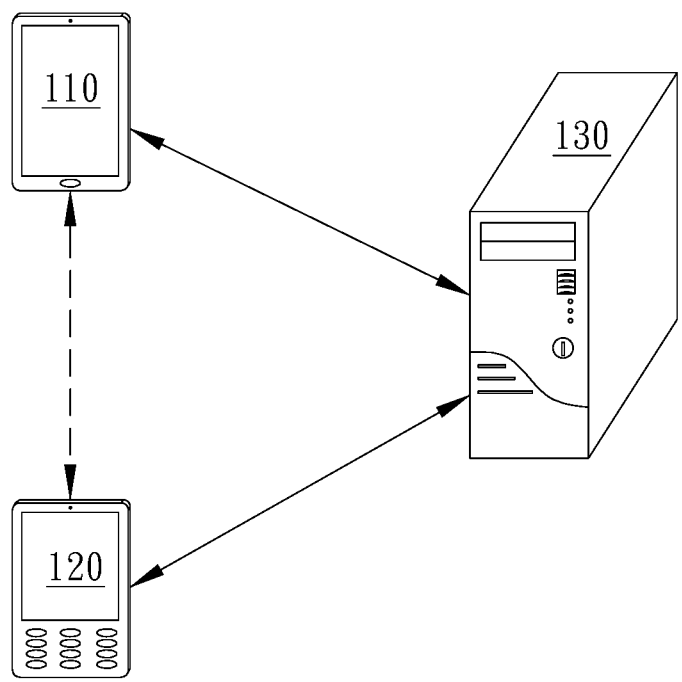
FIG. 1 is a schematic diagram in accordance with one embodiment of the present disclosure.

FIG. 1 is an embodiment of the communication system of the present disclosure. As shown in FIG. 1, in this embodiment, the communication system 100 at least includes a first communication device 110, a second communication device 120 and a backend service device 130.

In this embodiment, the first communication device 110 and the second communication device 120 are implemented by using a handheld computer, a smart phone, a desktop computer, a laptop computer, a tablet computer, or other electronic products which can be used for communication. The backend service device 130 can be a server and/or computer systems for backend customer service.

In this embodiment, in the beginning, the first communication device 110 and the second communication device 120 do not connect with each other. In other words, the first communication device 110 and the second communication device 120 do not communicate with each other or do not have any communication connection relationship. When a user of the first communication device 110 would like to communicate with a user of the second communication device 120 (or the user of the second communication device 120 would like to communicate with the first communication device 110), as shown in FIG. 1, the user of the first communication device 110 can operate with the user interface of the first communication device 110, and select a service in the user interface.

More particularly, it is assumed the communication system 100 of the present disclosure is a system for providing service pairing. For example, the communication system 100 is a communication system applied to a car rental service, the first communication device 110 can be a customer's smart phone, and the second communication device 120 can be a smart phone or a communication device of the car rental company. Under normal circumstances, in the beginning, the customer and a car rental company business staff do not know each other or have each other's contact information. The customer can send a message of service request via the first communication device 110 to the backend service device 130, such as a service center of a car rental platform. After the platform receives the service request from the customer, the platform will search if there is any appropriate car rental company, such as a business staff of the car rental company at the second communication device 120, to introduce to the customer according to the content of the service request. However, the business staff who provides the car rental service at the second communication device 120 may need to contact the customer at the first communication device 110 or explain different kinds of car rental plans, prices, contracts, etc. A method is required to allow the business staff to contact the customer, and ensure the customer's privacy as well.

Figure 2:
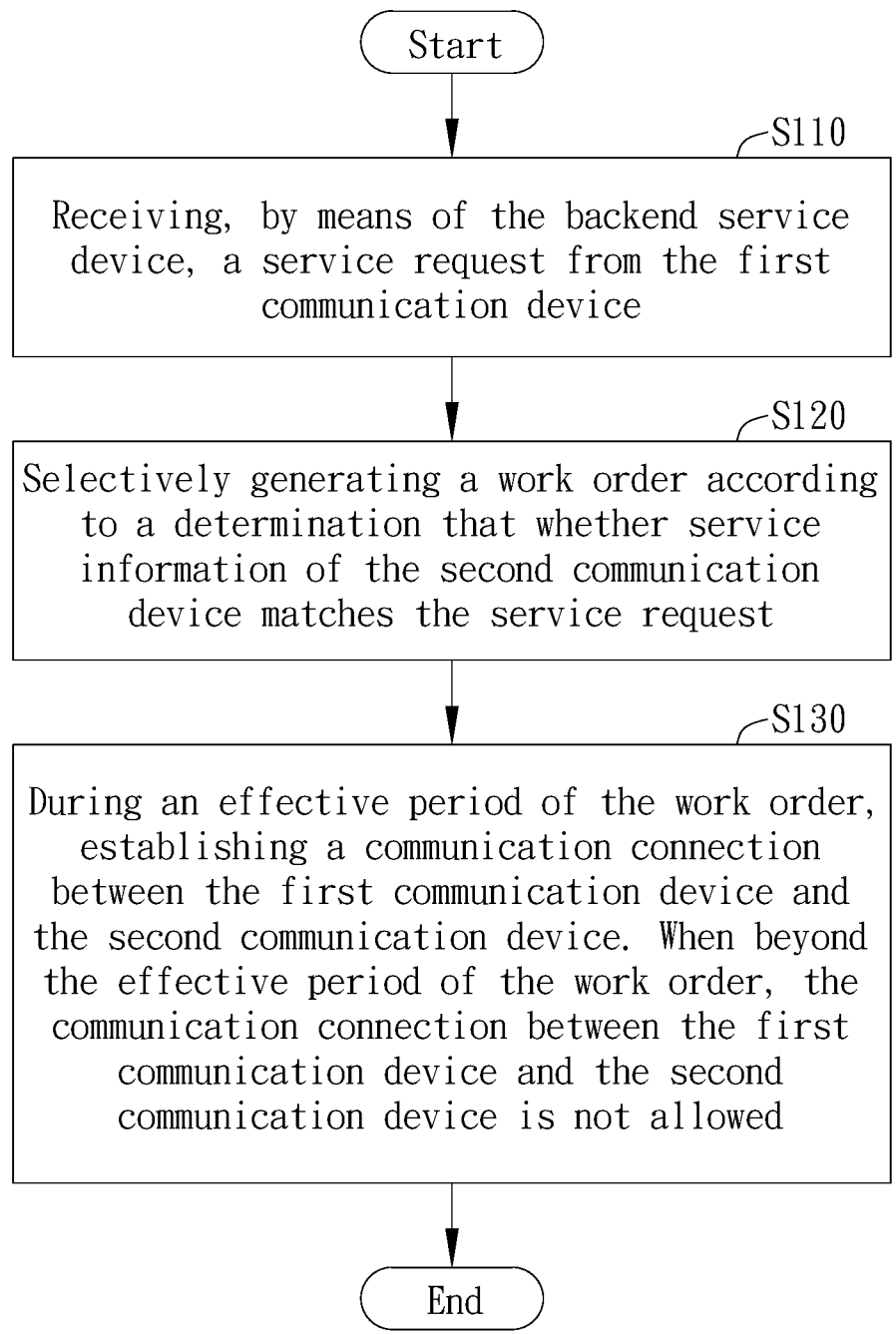
FIG. 2 is a flowchart of a method for establishing a communication connection in accordance with one embodiment of the present disclosure.

FIG. 2 is a flowchart illustrating a method for establishing a communication connection between the first communication device 110 and the second communication device 120 according to an embodiment of the present disclosure.

As shown in FIG. 2, in this embodiment of the present disclosure the method for establishing and managing communication connection includes steps S110 to S130.

Step S110 includes receiving a service request from the first communication device 110 by means of the backend service device 130. Taking the car rental platform mentioned above as an example, a customer is able to operate on the user interface of the first communication device 110, and enter desired services. The first communication device 110 generates a service request according to customer's operation, and sends the service request to the backend service device 130.

In this embodiment, the first communication 110 and the backend service device 130 are coupled. In an embodiment, a program, such as a smart phone's app program, can be installed on the first communication device 110. A user of the first communication device 110 is able to download an app program corresponding to the communication system 100 of the present disclosure via the first communication device 110, and can contact the backend service device 130 after installing the app on the first communication device 110. For example, the first communication device 110 can communicate with the backend service device 130 over the internet, but not limited thereto. In another embodiment, an app installed on the first communication device 110 is able to call the backend service device 130 by a service telephone number, and ask the customer to say the desired service request directly via telephone, and the backend service device 130 is able to use Artificial Intelligence such as machine learning and natural language processing to comprehend and process the service requests made by the customer automatically.

When the backend service device 130 receives the service request from the first communication device 110, the backend service device 130 is configured to check the content of the service request first. In this embodiment, the service request includes the choice of services of the first communication device 110, such as a specific car a user wants to rent, and the rental date a user wants to book.

Step S120 includes to selectively generate a work order according to whether a determination that whether service information of the second communication device 120 matches the service request. In this embodiment, the second communication device 120 has at least one service information, and the content of the service information is configured for explaining which service or product will be provided by the user of the second communication device 120 to the customer of the first communication device 110.

For example, take a taxi dispatch system as an example. The first communication device 110 can be a customer's smart phone, and the second communication device 120 can be a communication device on a taxi, and the backend service device 130 can be in a taxi dispatch center that is specifically configured to assign a taxi to a customer's location. The backend service device 130 of the taxi dispatch center is configured to assign a taxi to a customer's location according to a service request received from a customer of the first communication device 110 (for example, to request a taxi to pick up the customer). In this situation, the service information of the second communication device 120 (e.g., the taxi) can include the taxi's real-time location information, such as a GPS location. The second communication device 120 can transmit the latest real-time location information automatically and continuously to the backend service device 130 and/or the first communication device 110. By this way, the customer of the first communication device 110 can always know the taxi's location of the second communication device 120 and approximate time of arrival. However, service information is not limited to the example above; in other embodiments, service information may include other information related to the second communication device 120.

In another embodiment, a user of the second communication device 120 (a service or product provider) also can set service information of the second communication device 120. For example, the default service information can be as service information of renting a car, buying second hand car, car rental consultant, or car rental insurance consultant. This information represents the service/product which can be provided by the user of the second communication device 120. After setting the service information, the second communication device 120 can transmit the service information to the backend service device 130.

In this embodiment, the second communication device 120 can be connected with the backend device 130 over the internet. Like to the first communication device 110, if the second communication device 120 is a communication device such as a smart phone or tablet computer, the second communication device 120 can also install an app, and communicate with the backend service device 130 via this app program.

In one embodiment, the backend service device 130 may receive different service information from a plurality of different second communication devices 120. For example, one of the second communication devices 120 can provide a car rental service, and another one of the second communication devices 120 can provide ticket booking services (e.g., movie ticket booking and concert ticket booking) or provide the program writing service (for example, a service that can pair with freelance programmers). In other words, the services of the second communication devices 120 of the communication system 100 of present disclosure include various technologies or areas of expertise. By this way, it can be easier for the service request of the user of the first communication 110 to get a matched communication device 120.

Therefore, in Step S120, the backend service device 130 may receive service information from different second communication devices 120 (and these devices may provide different services). The service information can be stored into a database. In this embodiment, the database can be a data storage device of the backend service device 130, a remote storage device and/or another cloud storage system.

Figure 3:
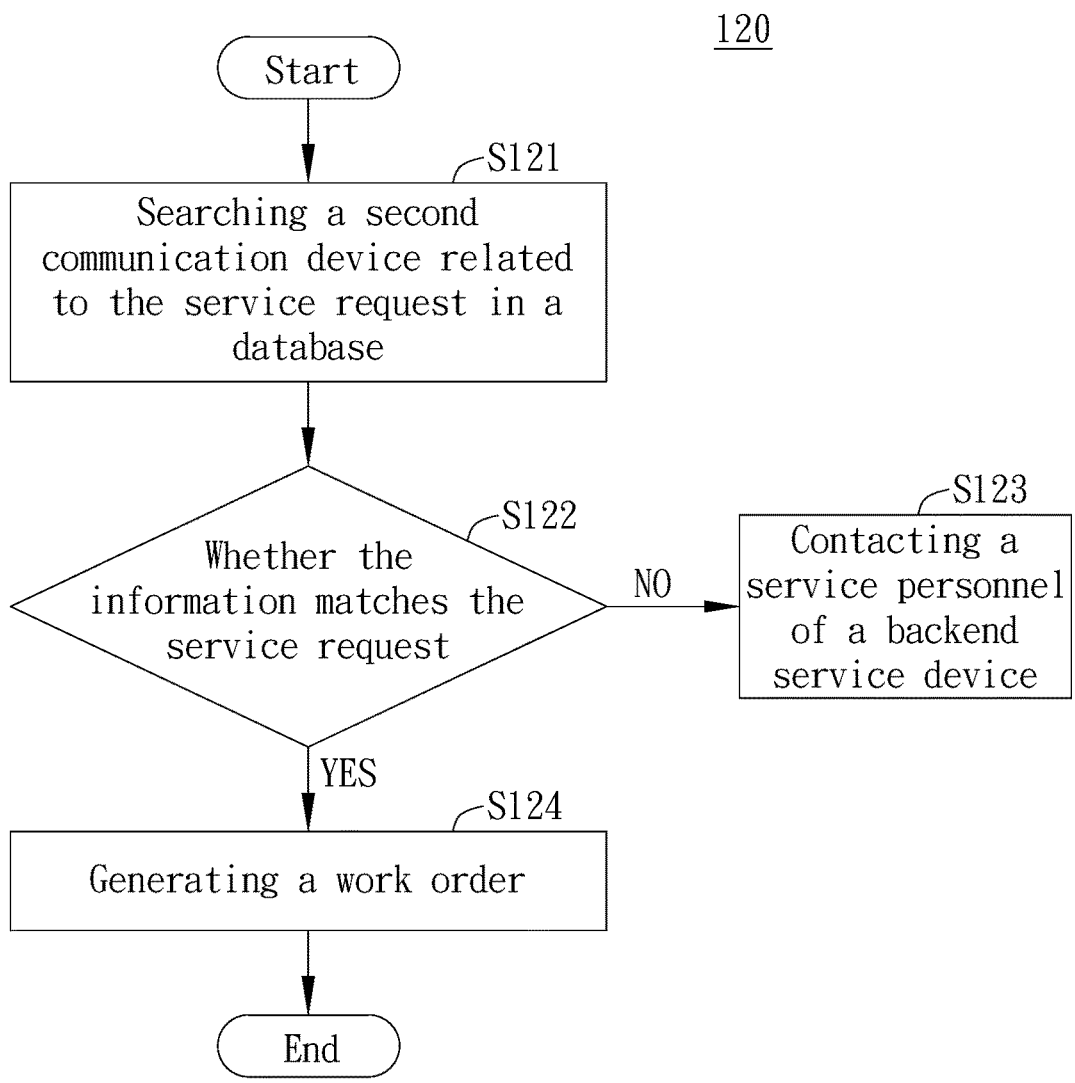
FIG. 3 is a flowchart of Step S120 in FIG. 2 in accordance with one embodiment of the present disclosure.

In an embodiment, Step S120 can further include steps S121 to S124, as shown in FIG. 3. When the backend service device 130 receives the service request from the first communication device 110, the backend service device 130 can proceed according to Step S121.

Step S121 includes searching a second communication device 120 related to the service request in a database. More particularly, through searching the different service information in the database, the backend service device 130 can more easily find service information matching the service request of the first communication device 110, and find a corresponding second communication device 120.

Step S122 includes comparing the service request with the searched service information. In one embodiment, when the backend service device 130 finds one or more service information which matches the service request, the backend service device 130 is configured to provide the corresponding service information of the second communication device 120 to the user of the first communication device 110 to serve as a reference. More particularly, in this embodiment, service information provided by each second communication device 120 includes auxiliary service information such as company names, service departments, details of provided service, price, and so on. These auxiliary service information can be provided to the first communication device 110 as a reference via the backend service device 130. If no service information related to the service request is found in the database, according to Step S123, the user can contact the service personnel of the backend service device 130 for further assistance.

In this embodiment, if the user of the first communication device 110 is interested in a service provided by the second communication device 120, the user can select the second communication device 120 on the user interface of the first communication device 110. When the backend service device 130 receives the selection instruction, the backend service device 130 can generate a work order according to Step S124. In this embodiment, the work order includes information of the first communication device 110 and the second communication device 120, such as user IDs, service contents, service start time, default service end time, messages or content of call between the first communication device 110 and the second communication device 120. In other words, the work order can include any possible information related to the first communication device 110 and the second communication device 120 during the period that the second communication device 120 provides the service to the first communication device 110. Through the work order, the backend service device 130 can track and monitor any service status between the first communication device 110 and the second communication device 120.

In another embodiment, before the backend service device 130 provides service information of the one or more second communication devices 120 to the first communication device 110, the backend service device 130 is configured to determine which service information of the second communication device 120 will be provided to the first communication device 110 according to a default filter condition. More particularly, the default filter condition can include, but not be limited to, the relative distance between the first communication device 110 and the second communication device 120, whether any work order is previously generated between the first communication 110 and the second communication 120 (that is, whether there have been transactions in the past), whether the service providers of the one or more second communication devices 120 express the acceptances of providing services to the user of the first communication device 110 (that is, the service providers of the second communication devices 120 is willing to accept the service request of the first communication device 110 and guarantees to accept the work order of the service request when he/she is selected by the user of the first communication service 110), and a possible time period of the work order.

As shown in FIG. 2, Step S130 includes that, during an effective period of the work order, the backend service device 130 establishes a communication connection between the first communication device 110 and the second communication device 120. When beyond the effective period of the work order, the communication connection between the first communication device 110 and the second communication device 120 is not allowed.

Figure 4:
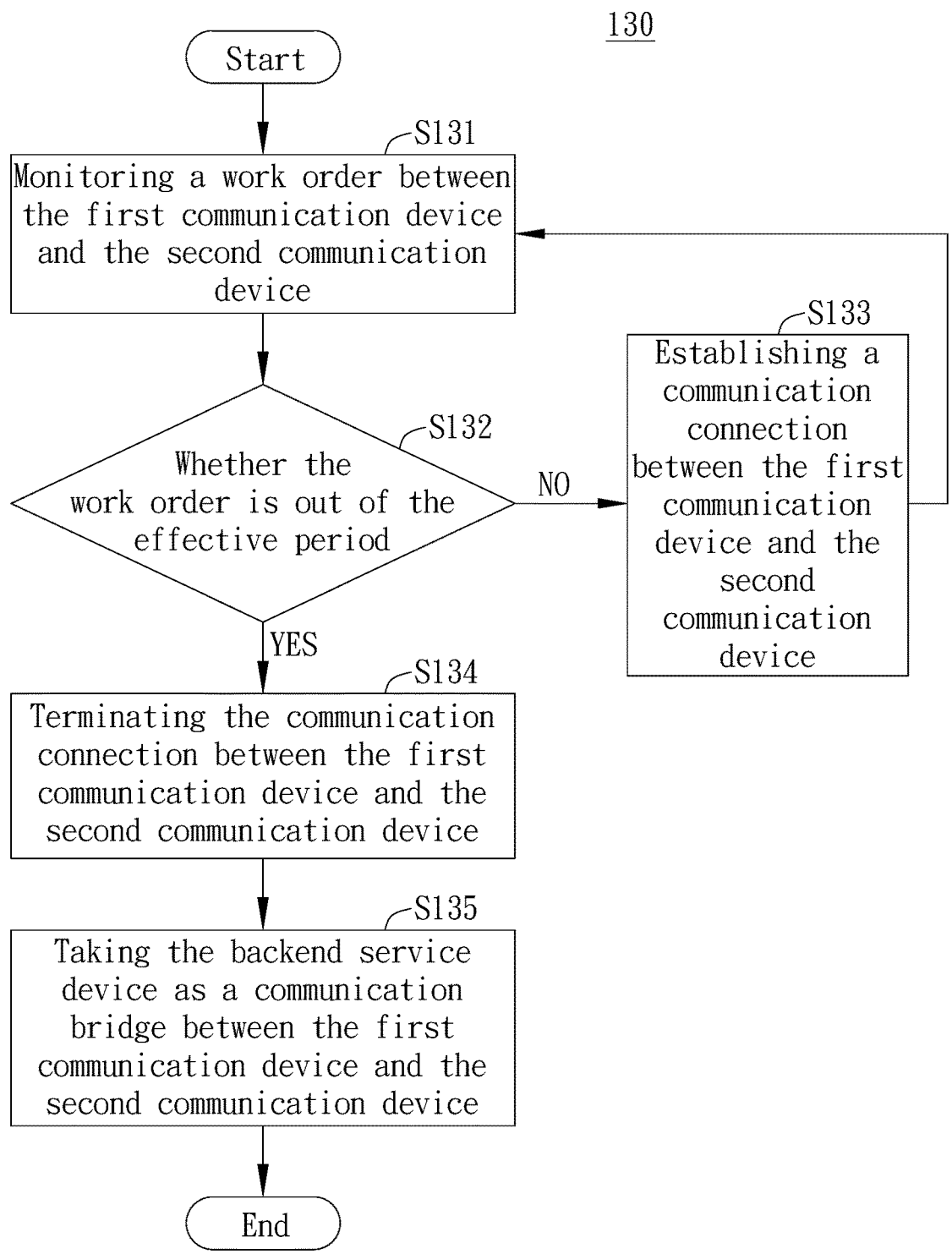
FIG. 4 is a flowchart of Step S130 in FIG. 2 in accordance with one embodiment of the present disclosure.

More particularly, Step S130 can further include Step S131 to S135, as shown in FIG. 4. The work order of the present disclosure is used to track service transaction events between the first communication device 110 and the second communication device 120.

Step S131 includes monitoring the work order between the first communication device 110 and the second communication device 120. More particularly, when the first communication device 110 is paired successfully with the second communication device 120, the backend service device 130 is configured to generate a work order for the first communication device 110 and the second communication device 120 to track and monitor the whole process of communications/transactions between the first communication device 110 and the second communication 120.

Step S132 includes checking whether the work order is out of the effective period. Under normal circumstances, unless the first communication device 110, the second communication 120, or the backend service device 130 raises an instruction/request to interrupt, stop, or terminate the work order of the first communication device 110 and the second communication 120, the work order between the first communication device 110 and the second communication device 120 is designed to have a default start time and a default end time. Under normal circumstances, the default start time is set to the time when the work order is generated. In other words, when the pairing of the first communication device 110 and the second communication 120 is established, the time the backend service device 130 generating the work order between the first communication device 110 and the second communication 120 is set as the start time of the work order. The default end time of the work order can be set according to the determination of the backend service device 130, or can be set according to a default time period. For example, taking the taxi dispatch system mentioned above as an example, the backend service device 130 is configured to determine how much time the second communication device 120 (e.g., a taxi) can complete a service mission according to information such as the relative distance between the first communication device 110 (e.g., the customer) and the second communication device 120, the destination, the traffic, etc., and determines the end time of the work order accordingly. In other words, the effective period of the work order means the time period between start time and end time of the work order in the backend service device 130, and the work order is valid in the backend service device 130 during such a period. During the period, the backend service device 130 is configured to monitor the work order between the first communication device 110 and the second communication device 120 and check whether the second communication device 120 completes the service mission during the period.

During the effective period of the work order, the procedure is performed according to Step S133. Step S133 includes establishing a communication connection between the first communication device 110 and the second communication device 120. More particularly, after generating the work order for the first communication device 110 and the second communication device 120, the backend service device 130 is configured to establish the communication connection between the first communication device 110 and the second communication device 120.

In this embodiment, after pairing the first communication device 110 with the second communication device 120, the service provider of the second communication device 120 may need to further communicate with the customer of the first communication device 110 (or the customer of the first communication device 110 may need to consult the service provider of the second communication device 120). Therefore, for this purpose, the backend service device 130 is configured to establish a communication connection between the first communication device 110 and the second communication device 120.

In this embodiment, the backend service device 130 can obtain the contact information of the first communication device 110 and the second communication device 120, and establish the communication connection between the first communication device 110 and the second communication device 120 according to the contact information. More particularly, in one embodiment, the first communication device 110 and the second communication device 120 are separately installed with a communication program. In this situation, the backend service device 130 can provide the contact information of the second communication device 120 to the communication program of the first communication device 110 (for example, an app program), and also provide the contact information of the first communication device 110 to the communication program of the second communication device 120 (for example, an app program related to the first communication device 110). By this way, the first communication device 110 can actively contact the second communication device 120, and the second communication device 120 can actively contact the first communication device 110 as well.

For example, the backend service device 130 is configured to provide a user ID of the communication program of the second communication device 120 to the communication program of the first communication device 110, and the communication program of the first communication device 110 is able to contact the communication program of the second communication device 120 according to the user ID. On the other hand, the backend service device 130 is configured to provide the user ID of the communication program of the first communication device 110 to the communication program of the second communication device 120, so that the communication of the second communication device 120 is able to contact the communication of the first communication device 110 according to the user ID. For example, if communication programs are separately installed in the first communication device 110 and the second communication device 120, the first communication device 110 and the second communication device 120 can establish the communication connection over the internet via the communication programs. It should be noted that, in this embodiment, due to the communication connection between the first communication device 110 and the second communication device 120 is established by using internet technology, the content of communication between the first communication device 110 and the second communication device 120 might be transmitted via one or more third party internet devices, such as a telephone company switching center, network switching equipment, etc.

In this embodiment, the communication connection between the first communication device 110 and the second communication device 120 can be established via Short Message Service (that is, SMS), Multimedia Messaging Service (that is, MMS), Voice Over Internet Phone (that is, VoIP), video, etc. For example, after the backend service device 130 provides the user ID of the first communication device 110 to the second communication device 120, the second communication device 120 can contact the first communication device 110 by using VoIP according to the user ID.

However, the connection methods between the first communication device 110 and the second communication device 120 are not limited to the methods above. In other embodiments, the first communication device 110 and/or the second communication device 120 also can launch a third party program such as Line by Never, Messenger by Facebook, WhatsApp, or WeChat. For example, the user ID of the second communication device 120 obtained by the backend service device 130 may be a Line ID of the second communication device 120. In this situation, the backend service device 130 can provide the Line ID to the communication program of the first communication device 110, and the communication program of the first communication device 110 can launch the Line app of the first communication device 110, and the first communication device 110 can contact the second communication device 120 via the Line app.

In addition, during the effective period of the work order, the backend service device 130 is configured to monitor and manage the work order of each pair of the first communication device 110 and the second communication device 120. During this effective period of the work order, the backend service device 130 records the messages and communication contents between the first communication device 110 and the second communication device 120. For example, whenever the first communication device 110 and the second communication device 120 communicate with each other, the communication program of the first communication device 110 and/or the second communication device 120 can transmit the content of communication to the backend service device 130 as backup. In this way, when there is a dispute or when a service from a service personnel of the backend service device 130 is needed, the service personnel can access the backup communication content, and easily realize the status between the customer of the first communication device 110 and the service provider of the second communication device 120.

As shown in FIG. 4, when beyond the effective period of the work order, the procedure is performed according to Step S134.

Step S134 includes terminating the communication connection between the first communication device 110 and the second communication device 120. In this embodiment, each work order has an effective period. More particularly, an effective period of a work order means a valid period of the work order. Under normal circumstances, the first communication device 110 and the second communication device 120 both have the right to ask to stop the transaction/contract/cooperation with each other. In this situation, when the backend service device 130 generates a work order of a pair of the first communication device 110 and the second communication device 120, due to the backend service device 130 does not know when the first communication device 110 and/or the second communication device 120 will raise a request for stopping the transaction or cooperation, the backend service device 130 can set the effective period of the work order to be infinite in the beginning. However, in other embodiments, the backend service device 130 can set a default effective period for a work order when generating the work order.

In another embodiment, during the effective period of the work order, the first communication device 110 and/or the second communication device 120 have the right to raise a service stop request. More particularly, if a customer of the first communication device 110 or a service provider of the second communication device 120 would like to terminate the contract/cooperation between the customer and the service provider, a service stop request can be sent to the backend service device 130 to ask the backend service device 130 to help stop the contract/cooperation. In another embodiment, during the effective period of the work order, when a service stop request (to terminate a transaction/contract/cooperation) has not be raised by the first communication device 110 and/or the second communication device 120, the backend service device 130 has the right to directly terminate the work order of the first communication device 110 and second communication device 120 (that is, to convert a valid work order to an invalid work order). In other embodiments, the backend service device 130 also has the right to control the effective period of the work order between each pair of the first communication device 110 and the second communication device 120, for example, to postpone or delay the default end time.

When beyond the effective period of the work order (i.e. when a valid order becomes invalid), a communication connection between the first communication device 110 and the second communication device 120 will be disallowed, stopped or terminated. More particularly, the communication connection between the first communication device 110 and the second communication device 120 (the communication from the first communication device 110 to the second communication device 120 and/or the communication from the second communication device 120 to the first communication device 110) will not be allowed by the backend service device 130 when beyond the effective period of the work order between the first communication device 110 and the second communication device 120. In this embodiment, the backend service device 130 will monitor each valid work order. When an effective period of a work order is expired (that is, beyond the effective period of the work order), the backend service device 130 is configured to force to stop the communication connection between the first communication device 110 and the second communication device 120.

Step S135 includes taking the backend service device 130 as a communication bridge between the first communication device 110 and the second communication device 120. More particularly, after beyond the effective period of the work order, the first communication device 110 and the second communication device 120 are unable to directly communicate with each other. In other words, the customer of the first communication device 110 is unable to directly contact the service provider of the second communication device 120, and the customer of the second communication device 120 is unable to directly contact the service provider of the first communication device 110.

In this situation, the backend service device 130 will back up information of the work order between the first communication device 110 and the second communication device 120. When there is a need for the first communication device 110 to contact the second communication device 120 (or the second communication device 120 needs to contact the first communication device 110), the communication between the first communication device 110 and the second communication device 120 will be accessed via the backend service device 130. For example, after the service provider of the second communication device 120 completes the service (and the effective period of the work order is expired), if the service provider of the second communication device 120 wants to submit a return request, the customer has to consult with a service personnel of the backend service device 130 (for example, submit a request, send out a message, make an internet call with the service personnel). The service personnel can communicate with the service provider of the second communication device 120 with reference to the content of the backed up information of the work order.

It should be noted, although one first communication device 110 and one second communication device 120 are taken as an example in the embodiments above, the present disclosure is not limited thereto. In different embodiments, a communication system 100 may include a plurality of first communication devices 110 and a plurality of second communication devices 120. The backend service device 130 is configured to pair one of the plurality of the second communication devices 120 with one of the first communication devices 110 according to a service request generated by the one of the plurality of the first communication devices 110, and generates a work order including information of the one of the first communication devices 110 and the one of the second communication devices 120. In this embodiment, the process is substantially the same with the embodiments described above, and many similar aspects will not be repeated herein.

In some approaches, the backend service device can transfer a call from the first communication device to a specific second communication device by identifying a phone number of the first communication device. However, when the specific second communication device has poor signal, the phone call may be transferred into the voice mailbox of the second communication device and results a connection error.

However, in an embodiment of the present disclosure, by using internet phone technology, such as VoIP, it can avoid entering the voice mailbox of the second communication device 120 when the second communication device 120 has poor signal, so as to avoid the connection error described above. In a further embodiment, the backend service device 130 may decide not to generate the work order corresponding to the foregoing service request according to the service information of the second communication device 120, so as to avoid an incorrectly communication connection being built between the first communication device 110 and the second communication device 120.

The foregoing description of specific embodiments will fully disclose the general of the embodiments described herein, after applying current knowledge, the embodiments of the present disclosure can be modified without departing from the spirit and scope of the present disclosure, and therefore the meaning and range of the equivalent forms of the embodiments of the present invention should be fully understood when they are modified. It should be understood that the phraseology or terminology employed herein is for the purpose of description and should not be regarded as limiting. Therefore, while specific embodiments are described, those skilled staff in the art will understand the embodiments described herein may be modified without departing from the spirit and scope of the present disclosure.

What is claimed is:

1. A communication system, comprising:
at least one first communication device configured for generating a service request;
at least one second communication device; and
a backend service device coupled to the first communication device and the second communication device, wherein the backend service device is configured for generating a work order comprising information regarding the first communication device and the second communication device based on the service request;

wherein during an effective period of the work order, a communication connection between the first communication device and the second communication device is allowed; and when beyond the effective period of the work order, the communication connection between the first communication device and the second communication device is not allowed;

wherein during the effective period of the work order, one of the first communication device and the second communication device is able to launch a third party communication program, so as to prompt another one of the first communication device and the second communication device to launch a corresponding communication program for establishing a communication connection with the third party communication program.

2. The communication system as claimed in claim 1, wherein the second communication device contains service information, the backend service device selectively generates the work order according to a determination that whether the service information matches the service request.

3. The communication system as claimed in claim 1, wherein during the effective period of the work order, the backend service device allows the communication connection between the first communication device and the second communication device; and when beyond the effective period of the work order, the backend service device does not allow the communication connection between the first communication device and the second communication device.

4. The communication system as claimed in claim 1, wherein during the effective period of the work order, the backend service device stores communication messages between the first communication device and the second communication device into a database.

5. The communication system as claimed in claim 4, wherein the communication connection between the first communication device and the second communication device is interrupted when beyond the effective period of the work order, wherein the first communication device and the second communication device are able to communicate with the backend service device separately, and the backend service device is configured to store communication content between the backend service device and the first communication device and communication content between the backend service device and the second communication device separately into the database.

6. The communication system as claimed in claim 1, wherein when the first communication device or the second communication device sends out a service stop request, the backend service device terminates the work order and stops the communication connection between the first communication device and the second communication device.

7. The communication system as claimed in claim 1, wherein the backend service device is configured to store communication messages between the third party communication program and the corresponding communication program during the effective period of the work order into a database.

8. The communication system as claimed in claim 1, wherein during the effective period of the work order, communication messages between the first communication device and the second communication are transmitted via the backend service device.

9. The communication system as claimed in claim 1, wherein the first communication device has an user ID, the backend service device is configured to search for a previous work order matched the user ID in a database, and acquire service information regarding the second communication device from the previous work order; wherein the service backend device is configured to compare the service request of the first communication device with the service information regarding the second communication device, and generate the work order when the service information matches the service request.

10. The communication system as claimed in claim 9, wherein each of the first communication device and the second communication device is implemented by using a handheld computer, a smart phone, a tablet computer, or a laptop computer.

11. The communication system as claimed in claim 1, wherein the backend service device is further configured to selectivity terminate the work order to block the communication connection between the first communication device and the second communication device.

12. The communication system as claimed in claim 1, wherein the at least one first communication device comprises a plurality of first communication devices, and the at least one second communication device comprises a plurality of second communication devices, the backend service device is configured to pair one of the second communication devices with one of the first communication devices according to the service request generated by the one of the first communication devices, to generate the work order comprising information regarding the one of the first communication devices and information regarding the one of the second communication devices.

13. A method for communication management in a communication system, the communication system comprising a first communication device, a second communication device and a backend service device, the method comprising:

receiving, by means of the backend service device, a service request from the first communication device;

selectively generating a work order according to a determination that whether service information of the second communication device matches the service request;

during an effective period of the work order, establishing a communication connection between the first communication device and the second communication device by means of the backend service device, and when beyond the effective period of the work order, blocking the communication connection between the first communication device and the second communication device;

wherein during the effective period of the work order, one of the first communication device and the second communication device is able to launch a third party communication program, so as to prompt another one of the first communication device and the second communication device to launch a corresponding communication program for establishing a communication connection with the third party communication program.

14. The method as claimed in claim 13, further comprising:

storing communication messages by means of the backend service device during the effective period of the work order between the first communication device and the second communication device into a database.

15. The method as claimed in claim 13, wherein when beyond the effective period of the work order, and the method further comprising:
interrupting the communication connection between the first communication device and the second communication device.

16. The method as claimed in claim 13, further comprising:
terminating the work order via the backend service device to block the communication connection between the first communication device and the second communication device.

17. The method as claimed in claim 13, wherein the at least one first communication device comprises a plurality of first communication devices, and the at least one second communication device comprises a plurality of second communication devices, and the step of generating the work order comprising:
pairing, by using the backend service device, one of the first communication devices and one of the second communication devices according to the service request from the one of the first communication devices, to generate the work order comprising information regarding the one of the first communication devices and information regarding the one of the second communication devices.

\* \* \* \* \*